United States Patent [19]

Fushimoto

[11] Patent Number: 4,563,552
[45] Date of Patent: Jan. 7, 1986

[54] ELECTRONIC APPARATUS FOR CONTROLLING MECHANICAL AND ELECTRICAL CONNECTION TO MEMORY MEANS

[75] Inventor: Hideo Fushimoto, Kawasaki, Japan

[73] Assignee: Canon Kabushiki Kaisha, Tokyo, Japan

[21] Appl. No.: 575,679

[22] Filed: Jan. 31, 1984

[30] Foreign Application Priority Data

Feb. 8, 1983 [JP] Japan ................... 58-18181

[51] Int. Cl.⁴ .............................................. H01H 9/20
[52] U.S. Cl. ................... 200/17 R; 200/50 A; 200/334
[58] Field of Search ............... 200/50 A, 50 C, 17 R, 200/61.58 R, 46, 16 D, 50 B, 5 R, 52 R, 61.62, 334; 307/132 EA, 116, 200 A; 361/395, 399, 413; 220/315, 316, 324, 326

[56] References Cited

U.S. PATENT DOCUMENTS 1,904,911  4/1933  Willoughby ................ 200/50 A
3,192,334  6/1965  Dimond et al. ............. 200/50 A Primary Examiner—A. D. Pellinen
Assistant Examiner—Morris Ginsburg
Attorney, Agent, or Firm—Fitzpatrick, Cella, Harper & Scinto

[57] ABSTRACT

An electronic apparatus such as an electronic calculator has a detachable electric member such as an external memory card and, to avoid unfavorable effects such as destruction of memory at attaching or detaching of the electric member, the apparatus is provided with a switch which automatically turns off the power supply to the electric member when it is being attached to or detached from the apparatus.

4 Claims, 8 Drawing Figures

ELECTRONIC APPARATUS FOR CONTROLLING MECHANICAL AND ELECTRICAL CONNECTION TO MEMORY MEANS

BACKGROUND OF THE INVENTION

1. Field of the Invention

The present invention relates to an electronic apparatus with a detachable electrical member such as an external memory.

2. Description of the Prior Art

In the conventional electronic apparatus such as an electronic calculator with program function, the use of an external memory, particularly a detachable memory card storing predetermined program or data, is well known for expanding the function of the electronic apparatus and is extremely useful for the operator in dispensing with the cumbersome operation of program or data entry through the keys provided in the electronic apparatus itself.

Such external memory or memory card is provided, for the purpose of mounting the same onto the electronic apparatus and transmitting the stored programs and data thereto, with plural connecting patterns which are maintained in electric pressure contact with a connector having plural contacts provided in the electronic apparatus.

However, attaching or detaching of the memory card, if conducted while the power supply is continued, may lead to the destruction of the program or data stored in the memory card or even of the processing circuitry in the electronic apparatus, since the connector functions as a spring and causes unstable chattering phenomenon.

SUMMARY OF THE INVENTION

In consideration of the foregoing, an object of the present invention is to provide an electronic apparatus in which an electrical member, constituting an external memory for supplying programs or data, can be attached or detached while it is completely separated from the power supply of the electronic apparatus.

Another object of the present invention is to provide an electronic apparatus capable of completely avoiding destruction of data at the detaching of an electrical member.

Still another object of the present invention is to provide an electronic apparatus with a detachable electrical member such as an external memory, wherein said apparatus is provided with a cover member for holding the external memory in the apparatus, first switch means engageable with the cover member and movable in two positions, and second switch means slidable in a direction perpendicular to the moving direction of the first switch means and adapted to prohibit the movement of the first switch means to a second position.

The foregoing and still other objects of the present invention will become fully apparent from the following description of the preferred embodiments.

BRIEF DESCRIPTION OF THE DRAWINGS

FIGS. 4 to 8 illustrate an embodiment of the present invention, wherein FIG. 4 is a perspective view thereof, FIGS. 5, 6 and 8 are plan views of a switch, and FIG. 7 is an exploded perspective view of the switch.

DETAILED DESCRIPTION OF THE PREFERRED EMBODIMENTS

Figure 1:
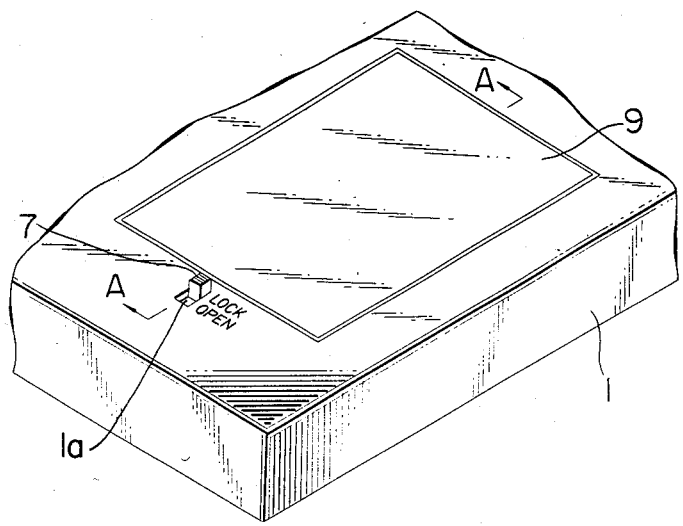
FIGS. 1 and 2 are perspective views showing the structure of a known device.
Figure 2:
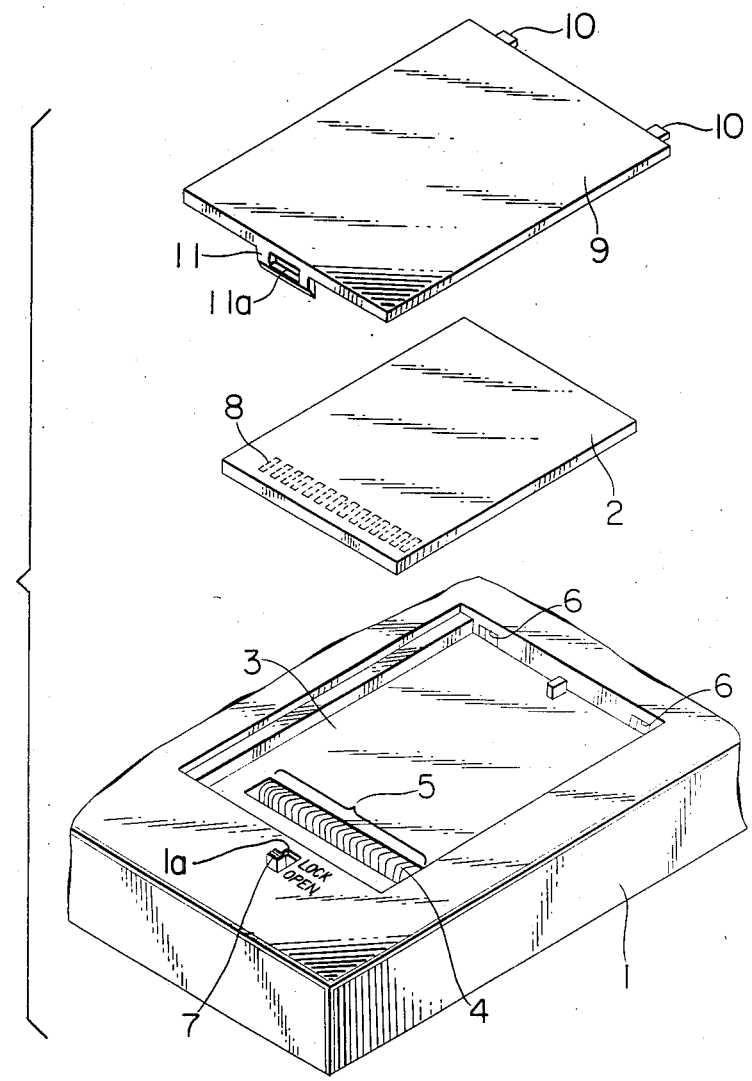
Figure 3:
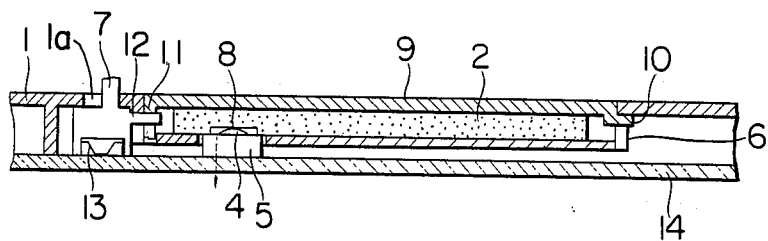
FIG. 3 is a cross-sectional view along a line A—A in FIG. 1.

FIGS. 1 to 3 show an example of memory card attach/detaching mechanism of known electronic apparatus.

In FIGS. 1 and 2, a case 1 of the electronic apparatus is provided with a recess 3 for accommodating a memory card 2. At the bottom of the recess 3 a pressure contact connector 5 with plural contacts 4 is provided in such a manner that the contacts 4 protrude slightly from the bottom of the recess 3. On an end face of the recess 3 are two rectangular apertures 6, while on an opposed face there is provided, in the case 1, a switch functioning as a power switch and a lock mechanism for the memory card as will be explained later. A slidable knob 7 protrudes from an aperture 1a provided on a lateral face of the case 1.

The memory card is formed as a flat box, which is provided on a face thereof with plural contact patterns 8 in such a manner as to be connected with the contacts 4 of the connector 5 formed on the bottom of the recess 3. In FIGS. 1 and 2 there is also shown a plate-shaped cover 9 for the memory card. On a shorter end the cover 9 is provided with two projections 10 to be fitted in the rectangular apertures 6 formed on an end face of the recess 3. On the opposed shorter end the cover 9 is provided with a downwardly extended projection 11 with a locking aperture 11a for engaging with a projection of the slidable knob provided inside the case 1.

More specifically, as shown in FIG. 3, the slidable knob 7 has an integral projection 12 for engaging with the locking aperture 11a of the projection 11 of the cover 9. The slidable knob 7 is further provided with an integral leaf contact 13 made of a conductive material. There is also shown a printed circuit board 14 provided in the case 1 and having circuit patterns for performing various processings.

In the above-described device the mounting of the memory card 2 onto the case 1 is achieved by the steps of inserting the memory card 2 into the recess 3 of the case 1, fitting the projections 10 of the cover 9 with the apertures 6 in the recess 3, rotating the cover 9 about the engaging position between the projections 10 and apertures 6 to depress the memory card 2 against the bottom of the recess 3, and moving the slidable knob 7 toward the memory card to engage the projection 12 of the knob with locking aperture 11a of the projection 11 of the cover 9, thus locking the cover 9 to the case 1 and maintaining the contact patterns 8 of the memory card 2 in contact with the contacts 4 of the connector 5.

The detaching of the memory card 2 from the case 1 is achieved by moving the slidable knob 7 away from the memory card 2 to disengage the projection of said knob from the locking aperture 11a of the projection 11 of the cover 9, whereby the memory card 2 is pushed upwards by the elastic force of the contacts 4 of the connector 5, and then extracting the projections 10 of the cover 9 from the apertures 6 of the recess 3 so that the cover and the memory card 2 may be detached from the case 1.

In the above-described structure, the leaf contact 13 integral with the slidable knob 7 also moves by the motion thereof to disengage the projection 12 from the locking aperture 11a for detaching the memory card 2. Consequently it is possible to detach the memory card 2 while the power supply is cut off, if the patterns on the printed circuit board 14 are formed in such a manner as to turn off the power supply of the electronic apparatus 1 by the movement.

The mounting of the memory card 2 to the case 1 is achieved by placing the memory card 2 in the recess 3, attaching the cover 9 and moving the slidable knob 7 to engage the projection 12 thereof with the locking aperture 11a of the projection 11 of the cover 9 thereby securing the cover 9 to the case 1.

Thus, the power supply to the electronic apparatus is turned on only after the memory card 2 is securely mounted to the case 1 if the patterns of the printed circuit board 14 are so constructed that the power supply is turned on by the movement of the leaf contact 13.

In this manner a single slidable knob can be used for turning on and off the power supply and for locking and unlocking the cover, thus avoiding the destruction of the electrical member such as the memory card.

In the above-described device, however, if the slidable knob 7 is moved quickly at the detaching of the memory card 2, unstable contact state between the contact patterns 8 of the memory card 2 and the contacts 4 of the connector 5 appears practically simultaneously with the turning off of the power supply in the electronic apparatus 1. If the power supply circuit contains a power accumulating element such as a capacitor, the actual power cut-off is delayed from the movement of the slidable knob 7. Therefore the destruction of the programs or data in the memory card may result by the unstable contact between the contact patterns 8 of the memory card 2 and the contacts 4 of the connector 5.

FIGS. 4 to 8 illustrate an embodiment of the present invention capable of rectifying the drawback of the foregoing device, wherein components which are the same as or corresponding to those shown in FIGS. 1 to 3 are represented by the same numbers and will be omitted from the following description.

Figure 4:
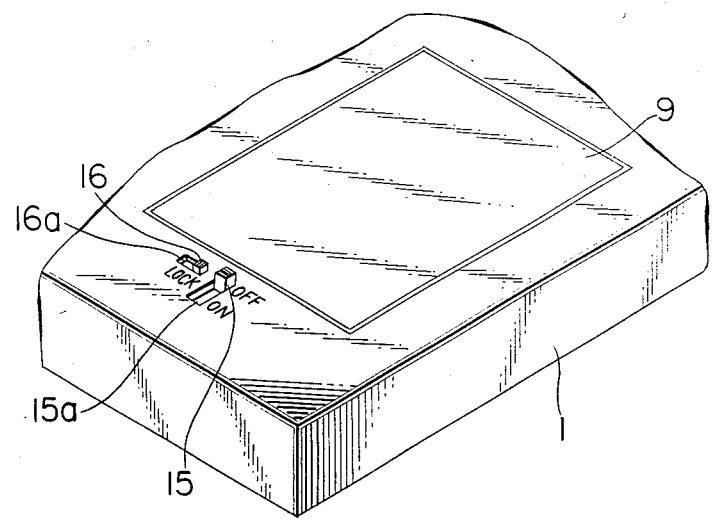

FIG. 4 is an external perspective view of the case 1, wherein a switch knob 15 for turning on/off the power supply and for locking/unlocking is fitted in a slot 15a so as to be slidable in the longitudinal direction of the cover 9, while a locking knob 16 is fitted in a slot 16a of the case 1 so as to be slidable in a direction perpendicular to the sliding direction of the knob 15.

Figure 7:
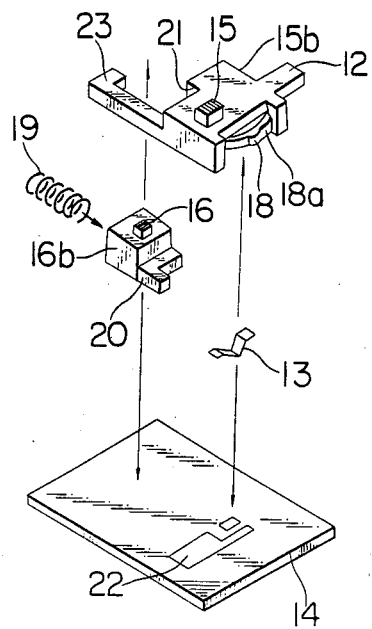

FIG. 7 is an exploded perspective view of a power/-lock switch of this embodiment formed on a block 15b. On a lateral face of the block 15b there is integrally formed an arc-shaped element 18a, with a click projection 18 at the center thereof, having elasticity in a direction perpendicular to the sliding direction of the knob 15.

Also on an opposed face to the click projection 18, there is formed a projection 21 and an L-shaped hook 23 which extends from the projection in the sliding direction and is formed slightly lower than the upper surface of the block 15b.

The locking knob 16 is formed on a block 16b which is fitted between the projection 21 and the hook 23 of the aforementioned block 15b.

The block 16b is further provided, on a lateral face thereof facing toward the click projection 18, with an L-shaped stopper 20 extending under the block 15b.

The block 16b is biased by a spring 19 toward the block 15b. Further a circuit pattern 22 is formed on the printed circuit board 14.

The following explains the assembling of the switch and spring 19. In the case 1 there is formed a frame 1b slidably accomodating the blocks 15b, 16b and provided with three click grooves 17 for engaging with click projection. The block 16b is fitted in said frame 16 so as to be perpendicular to the moving direction of the block 15b, and the spring 19 is fitted to bias the block 16b toward the block 15b. The assembly is conducted in such a manner that the upper faces of the blocks 15b and 16b are coplanar, and that the lower faces of the hook 23, stopper 20 and blocks 15b, 16b are coplanar.

In the following explained is the method of use and function of the present embodiment described above.

Figure 5:
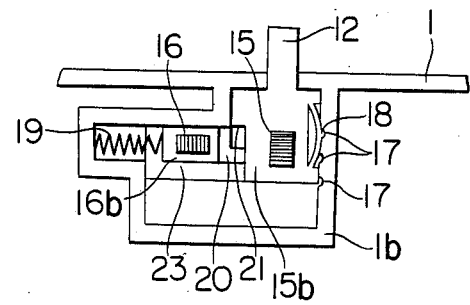

FIG. 5 shows a plan view of the switch in a state where the memory card 2 is mounted in the case 1, and the projection 12 protrudes from the case 1 into the recess 3 to engage with the locking aperture 11a of the projection 11 of the cover 9.

Figure 6:
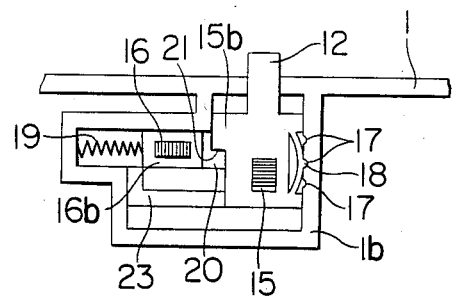

At the same time the click projection 18 integral with the block 15b engages with one of three click grooves 17 closest to the recess 3. When detaching the memory card 2 and the cover 9 from the case 1, the knob 15 is moved, from the state shown in FIG. 5, away from the recess 3 as shown in FIG. 6. FIG. 6 shows a step of turning off the power supply of the electronic apparatus while the cover 9 is still maintained in engagement with the projection 12. In this state the projection 12 of the block 15b still protrudes into the recess 3 and engages with the cover 9, so that the memory card 2 is still in contact with the contacts 4 of the connector 5. In this state the stopper 20 projecting from the block 16b engages with the projection 21 of the block 15b, thus hindering further movement thereof in a direction away from the recess 3. Also the click projection 18 of the block 15b engages with the central one of three click grooves 17 formed on the case 1, thus defining a step in the movement of the block 15b. The circuit pattern 22 formed on the printed circuit board 14 is formed in such a manner that the power supply PS in the electronic apparatus 1 is cut off in this state by relative positioning of the pattern 22 and the leaf contact 13 provided on the block 15b. After the power supply is cut off in this manner, the knob 16 is moved in a direction away from the knob 15, thus disengaging the stopper 20 from the projection 21. Then the block 15b is further moved away from the recess 3 of the case 1 to reach a state shown in FIG. 8.

Figure 8:
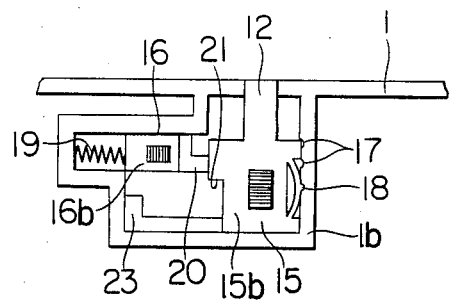

In the state shown in FIG. 8, the projection 12 of the block 15b no longer protrudes in the recess 3 and is therefore disengaged from the locking aperture 11a of the projection 11 of the cover 9, thus enabling the removal of the cover 9 and memory card 2 from the case 1. In this state the click projection 18 of the block 15b engages with one of three click grooves 17 farthest the recess 3.

The hook 23 formed on the block 15b is present in order to avoid a one-step movement of the knob 15 from the state shown in FIG. 5 to the state in FIG. 8 after the knob 16 is shifted away from the knob 15 against the force of the spring 19, thus disengaging the stopper 20 from the projection 21. More specifically, in the state shown in FIG. 5, the hook 23 engages a lateral face of the block 16b opposite to the block 15b to prohibit the movement of the block 16b. In the state shown in FIG. 6, the hook 23 formed integral with the block 15b is disengaged from the block 16b by the movement of the block 15b to the position shown in FIG. 6, so that the block 16b is rendered slidable thus achieving the aforementioned effect.

Now there will be explained the method of use and function in case of mounting the memory card 2 and the cover 9 onto the case 1. After the cover 9 is mounted, the knob 15 is moved toward the recess 3, from the state of FIG. 8 to the state of FIG. 6, whereupon the block 16b is biased toward the block 15b by the compressed spring 19 and reaches a lateral face of the block 15b next to the projection 21.

In this state the projection 12 of the block 15b engages with the locking aperture 11a of the projection 11 of the cover 9, thus securing the cover 9 and the memory card 2 to the case 1. Then the block 15b is further moved to the state shown in FIG. 5 whereby the bent portion of the leaf contact 13 is brought into contact with the pattern 22 to restore power supply to the electronic apparatus 1.

The above-described embodiment is capable, in an electronic apparatus with a detachable electrical member such as a memory card functioning as an external memory, of completely preventing destruction of the programs and data stored in the memory card or of processing circuitry in the apparatus resulting from unstable connection of the memory card and electronic apparatus, since the attaching or detaching of the memory card takes place in a state that the power supply to the electronic apparatus is completely cut off.

As explained in the foregoing, the present invention enables, in an electronic apparatus with a detachable electrical member such as a memory card functioning as an external memory, to completely prevent destruction of the programs or data stored in the memory card or of the circuitry in the apparatus since the power supply of the apparatus is completely cut off at the attaching or detaching of the memory card.

What is claimed is:

1. Electronic apparatus controlling mechanical and electrical connection to memory means, comprising:
    container means provided in the electronic apparatus for detachably holding the memory means;
    first movable means movable to a first position in which the memory means is electrically driven and to a second position in which the memory means is not electrically driven;
    second movable means mounted so as to be movable when said first movable means is moved from its first position to its second position; and
    third movable means mounted so as to be operable after movement of said second movable means;
    wherein the operation of said third movable means enables the memory means to be detached from said container means.

2. Electronic apparatus according to claim 1, wherein:
    said first movable means includes an electrical contact, a portion for limiting the movement of said second movable means and a portion for limiting the movement of said third movable means,
    said second movable means includes a portion for limiting the movement of said first movable means, and
    said third movable means includes a cover member for holding said memory means in said container means.

3. Electronic apparatus controlling mechanical connection and electrical control to memory means, comprising:
    container means provided in the electronic apparatus for containing the memory means;
    holding means movable among a first position, a second position and a third position for mechanically holding the memory means in said container means when said holding means is in the first and second positions thereof; and
    switch means for outputting an electrical signal to the memory means when said holding means is in the first position thereof, and for interrupting the electrical signal to the memory means when said holding means is in the second and third positions thereof.

4. Electronic apparatus according to claim 3, further comprising a cover member stopped by said holding means for inhibiting removal of said memory means from said container means when said holding means is in the first and second positions thereof, and for permitting removal of the memory means from said container means when said holding means is in the third position thereof, wherein said cover member is released by said holding means.

* * * * *